(12) United States Patent
Zhang et al.

(10) Patent No.: US 12,506,582 B2
(45) Date of Patent: Dec. 23, 2025

(54) DEFAULT BEAMS FOR PDSCH, CSI-RS, PUCCH AND SRS

(71) Applicant: Apple Inc., Cupertino, CA (US)

(72) Inventors: Yushu Zhang, Beijing (CN); Chunhai Yao, Beijing (CN); Dawei Zhang, Cupertino, CA (US); Haitong Sun, Cupertino, CA (US); Oghenekome Oteri, Cupertino, CA (US); Seyed Ali Akbar Fakoorian, Cupertino, CA (US); Sigen Ye, Cupertino, CA (US); Wei Zeng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,012

(22) PCT Filed: Jan. 14, 2021

(86) PCT No.: PCT/CN2021/071831
§ 371 (c)(1),
(2) Date: Sep. 24, 2021

(87) PCT Pub. No.: WO2022/151190
PCT Pub. Date: Jul. 21, 2022

(65) Prior Publication Data
US 2023/0345477 A1 Oct. 26, 2023

(51) Int. Cl.
*H04L 5/00* (2006.01)
*H04B 7/06* (2006.01)
(Continued)

(52) U.S. Cl.
CPC .......... *H04L 5/0094* (2013.01); *H04L 5/0053* (2013.01); *H04W 16/28* (2013.01);
(Continued)

(58) Field of Classification Search
CPC ... H04L 5/0094; H04L 5/0053; H04L 5/0091; H04B 7/0695; H04W 16/28; H04W 72/1268; H04W 72/1273; H04W 72/232
See application file for complete search history.

(56) References Cited

U.S. PATENT DOCUMENTS

2020/0337058 A1\* 10/2020 Song ...................... H04W 72/53
2021/0112560 A1\* 4/2021 Khoshnevisan ...... H04W 72/23
(Continued)

FOREIGN PATENT DOCUMENTS

WO 2019/099659 A1 5/2019
WO 2019/193581 A2 10/2019
(Continued)

OTHER PUBLICATIONS

ETSI TS 138 214 V16.2.0 (Jul. 2020) (Year: 2020).\*
(Continued)

*Primary Examiner* — Habte Mered
(74) *Attorney, Agent, or Firm* — Kubota & Basol LLP

(57) ABSTRACT

A method and apparatus configuring default beams are described.
In some embodiments, the method of wireless communication at a User Equipment (UE) comprises: receiving, from a base station, configuration information for configuring a default beam for the physical downlink shared channel (PDSCH) to use on condition that an offset between reception of downlink control information (DCI) in the scheduling physical downlink control channel (PDCCH) and corresponding PDSCH is less than a threshold and at least one Transmission Configuration Indicator (TCI) states includes spatial receiving parameters for configuring a quasi-co-location; configuring, by the UE, a default beam configuration for the PDSCH based on the configuration information and a monitored control resource set (CORESET) with a lowest CORESET identifier (ID) from among a set of (Continued)

CORESETs in a latest slot in a same bandwidth part (BWP), wherein at least one CORSET of the set of CORESETs includes more than one TCI state; and receiving a transmission using the default beam.

18 Claims, 10 Drawing Sheets

(51) Int. Cl.
*H04W 16/28* (2009.01)
*H04W 72/1268* (2023.01)
*H04W 72/1273* (2023.01)
*H04W 72/232* (2023.01)

(52) U.S. Cl.
CPC ... *H04W 72/1268* (2013.01); *H04W 72/1273* (2013.01); *H04W 72/232* (2023.01)

(56) References Cited

U.S. PATENT DOCUMENTS

| | | | |
|---|---|---|---|
| 2021/0159966 A1* | 5/2021 | Xi | H04B 7/088 |
| 2021/0306994 A1* | 9/2021 | Venugopal | H04L 5/0053 |
| 2022/0330167 A1* | 10/2022 | Chen | H04W 52/54 |
| 2022/0407656 A1 | 12/2022 | Matsumura et al. | |
| 2022/0417964 A1 | 12/2022 | Matsumura et al. | |
| 2023/0006795 A1* | 1/2023 | Gao | H04B 7/06968 |
| 2023/0046727 A1 | 2/2023 | Jung et al. | |
| 2023/0061726 A1 | 3/2023 | Jung et al. | |
| 2023/0083208 A1 | 3/2023 | Zhang et al. | |
| 2023/0144103 A1* | 5/2023 | Gao | H04W 72/20 370/329 |
| 2023/0217458 A1* | 7/2023 | Bang | H04J 11/00 370/329 |
| 2023/0299916 A1* | 9/2023 | Muruganathan | H04L 5/0094 370/329 |
| 2023/0328539 A1 | 10/2023 | Matsumura et al. | |
| 2023/0345505 A1 | 10/2023 | Guo | |
| 2023/0362665 A1* | 11/2023 | Xiao | H04W 72/232 |
| 2023/0362968 A1* | 11/2023 | Xi | H04W 72/046 |
| 2023/0379108 A1 | 11/2023 | Grossmann et al. | |
| 2023/0379936 A1 | 11/2023 | Matsumura et al. | |
| 2023/0389038 A1 | 11/2023 | Matsumura et al. | |
| 2023/0397204 A1* | 12/2023 | Yuan | H04L 1/08 |
| 2024/0015723 A1 | 1/2024 | Yang et al. | |
| 2024/0015753 A1 | 1/2024 | Matsumura et al. | |
| 2024/0032060 A1* | 1/2024 | Matsumura | H04W 76/20 |
| 2024/0040583 A1 | 2/2024 | Liu et al. | |
| 2024/0063880 A1 | 2/2024 | Ling et al. | |
| 2024/0348404 A1 | 10/2024 | Ling et al. | |
| 2024/0414734 A1 | 12/2024 | Matsumura et al. | |

FOREIGN PATENT DOCUMENTS

| | | |
|---|---|---|
| WO | 2019/215709 A1 | 11/2019 |
| WO | 2022/147635 A1 | 7/2022 |

OTHER PUBLICATIONS

Apple Inc. "Remaining Issues on Multi-beam operation" 3GPP TSG RAN WG1 #101 R1-2004230, Jun. 5, 2020 section 2.

International Preliminary Report on Patentability received for PCT Patent Application No. PCT/CN2021/071831, mailed on Jul. 27, 2023, 6 pages.

International Search Report and Written Opinion received for PCT Patent Application No. PCT/CN2021/071831, mailed on Oct. 12, 2021, 8 pages.

Samsung. "Remaining Issues on Beam Management" 3GPP TSG RAN WG1 Meeting #94bis R1-1810839, Oct. 12, 2018, whole document.

Non-Final Office Action received for U.S. Appl. No. 17/951,789, mailed on Dec. 18, 2023, 18 pages.

Final Office Action received for U.S. Appl. No. 17/951,789, mailed on Jul. 18, 2024, 24 pages.

Final Office Action received for U.S. Appl. No. 17/951,789, mailed on Jul. 16, 2025, 25 pages.

Non-Final Office Action received for U.S. Appl. No. 17/951,789, mailed on Jan. 3, 2025, 25 pages.

* cited by examiner

DEFAULT BEAMS FOR PDSCH, CSI-RS, PUCCH AND SRS

RELATED APPLICATIONS

The present application is the national phase of International Application No. PCT/CN2021/071831, filed on Jan. 14, 2021 and the disclosure of which is hereby incorporated herein by reference in its entirety.

FIELD OF INVENTION

Embodiments described herein relate generally to wireless technology and more particularly to default beams in new radio (NR).

BACKGROUND

Fifth generation mobile network (5G) is a wireless standard that aims to improve upon data transmission speed, reliability, availability, and more. This standard, while still developing, includes numerous details relating to various aspects of wireless communication, for example, NR and NR in a spectrum greater than 52.6 GHz.

SUMMARY OF THE DESCRIPTION

A method and apparatus configuring default beams are described.

In some embodiments, the method of wireless communication at a User Equipment (II E) comprises: receiving, from a base station, configuration information for configuring a default beam for the physical downlink shared channel (PDSCH) to use on condition that an offset between reception of downlink control information (DCI) in the scheduling physical downlink control channel (PDCCH) and corresponding PDSCH is less than a threshold and at least one Transmission Configuration Indicator (TCI) states includes spatial receiving parameters for configuring a quasi-co-location; configuring, by the UE, a default beam configuration for the PDSCH based on the configuration information and a monitored control resource set (CORESET) with a lowest CORESET identifier (ID) from among a set of CORESETs in a latest slot in a same bandwidth part (BWP), wherein at least one CORSET of the set of CORESETs includes more than one TCI state; and receiving a transmission using the default beam.

A method of wireless communication at a User Equipment (UE) comprising: receiving, from a base station, configuration information for a default Physical Uplink Control Channel/Sounding Reference Signal (PUCCH/SRS) beam and pathloss reference signal (RS); configuring, by the UE, the default PUCCH/SRS beam and pathloss RS based on the configuration information and a monitored control resource set (CORESET) with a lowest CORESET identifier (ID) from among a set of CORESETs in a same bandwidth part (BWP); and sending a transmission using the default PUCCH/SRS beam.

A method for use in a base station, the method comprising: determining a configuration for a wireless device, wherein the configuration is included in configuration information that specifies one or more of: a default beam configuration for the physical downlink shared channel (PDSCH) to use on condition that an offset between reception of downlink control information (DCI) in the scheduling physical downlink control channel (PDCCH) and corresponding PDSCH is less than a threshold and at least one Transmission Configuration Indicator (TCI) states includes spatial receiving parameters for configuring a quasi-co-location, and a default PUCCH/SRS beam and pathloss reference signal (RS); and transmitting, to a UE, the configuration information identifying a default configuration for one or more of the default PUCCH/SRS beam and pathloss reference signal (RS) and the default PUCCH/SRS beam and pathloss reference signal (RS), wherein the default PDSCH beam configuration is based on the configuration information and a monitored control resource set (CORESET) with a lowest CORESET identifier (ID) from among a set of CORESETs in a latest slot in a same bandwidth part (BWP), wherein at least one CORSET of the set of CORESETs includes more than one TCI state; and wherein the default PUCCH/SRS beam and pathloss RS based on the configuration information and a monitored CORESET with a lowest CORESET identifier (ID) from among a set of CORESETs in a same BWP.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
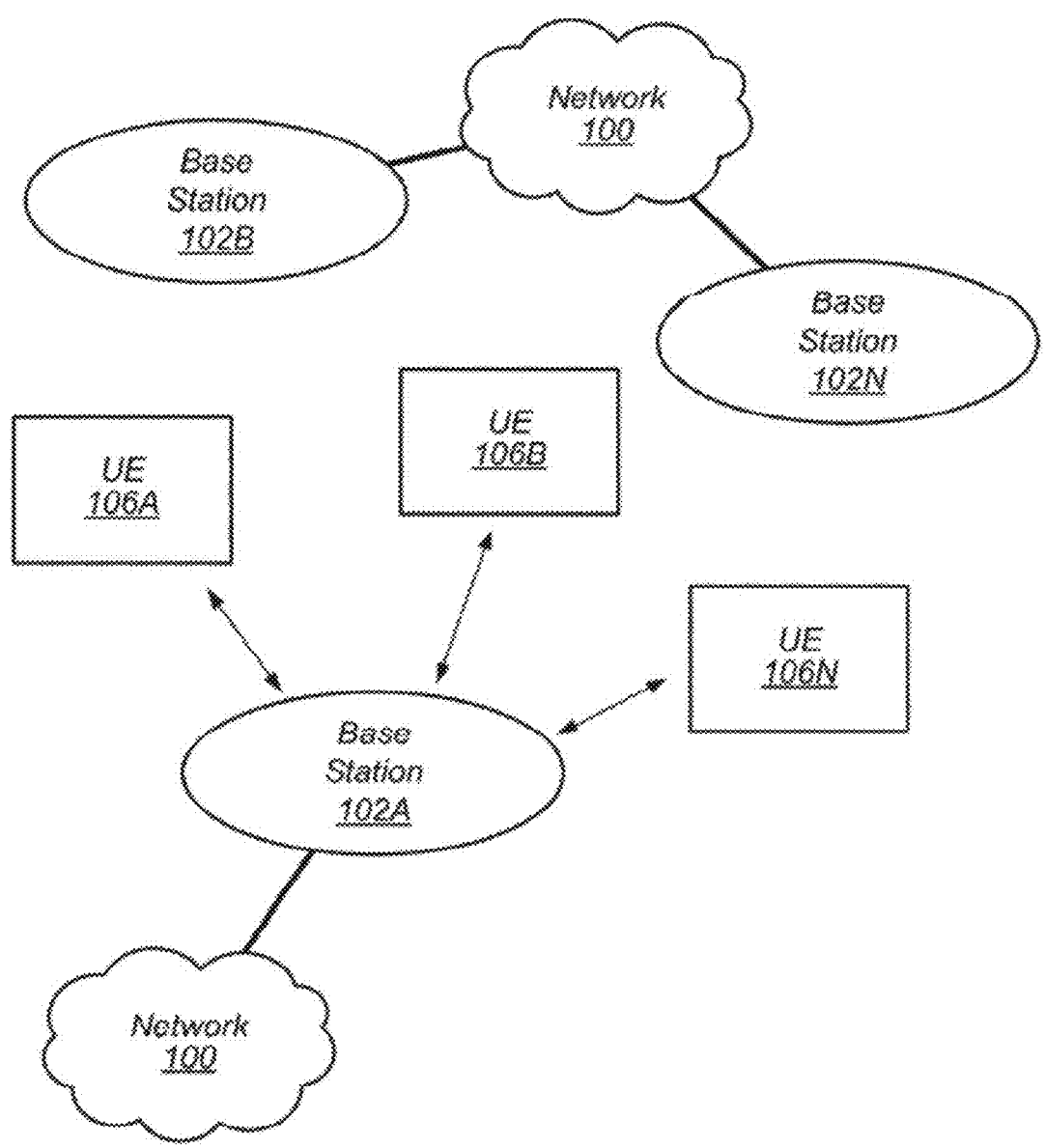
FIG. 1 illustrates an example wireless communication system according to some embodiments.

A method and apparatus of a device that determines default beams is described. In the following description, numerous specific details are set forth to provide thorough explanation of embodiments of the present disclosure. It will be apparent, however, to one skilled in the art, that embodiments of the present disclosure may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the disclosure. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device (e.g., a UE) that determines default beams to use for communication between a base station and a UE. In some embodiments, these default beams are for a default beam for the physical downlink shared channel (PDSCH), a default aperiodic Channel Status Information-Reference Signal (CSI-RS) beam, and/or a default PUCCH/SRS beam and pathloss reference signal (RS). The device may determine the default beams to use based on configuration information. In one embodiment, the configuration information is from a gNB (e.g., a base station). In some embodiments, the default beams are determined when there are two Transmission Configuration Indicator (TCI) states configured in a selected or monitored control resource set (CORESET). In some embodiments, the default beams are determined based on one or more (e.g., two) of the TCI states of a CORESET.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
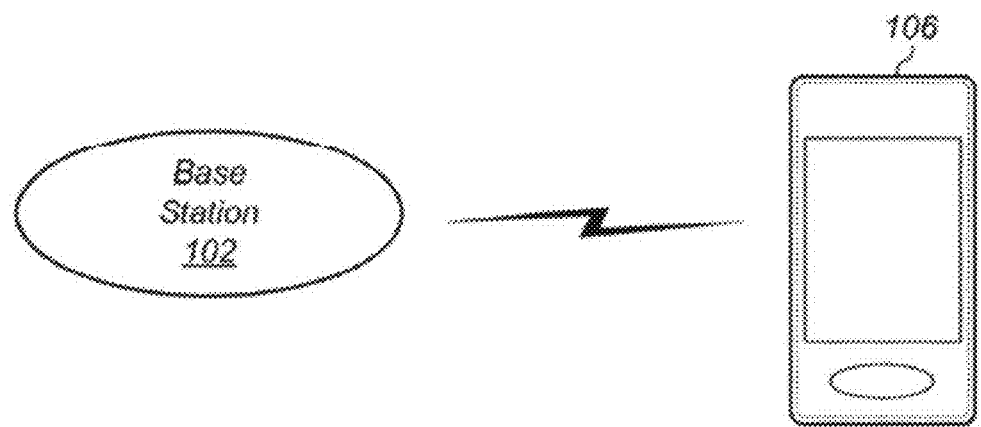
FIG. 2 illustrates a base station (BS) in communication with a user equipment (UE) device according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
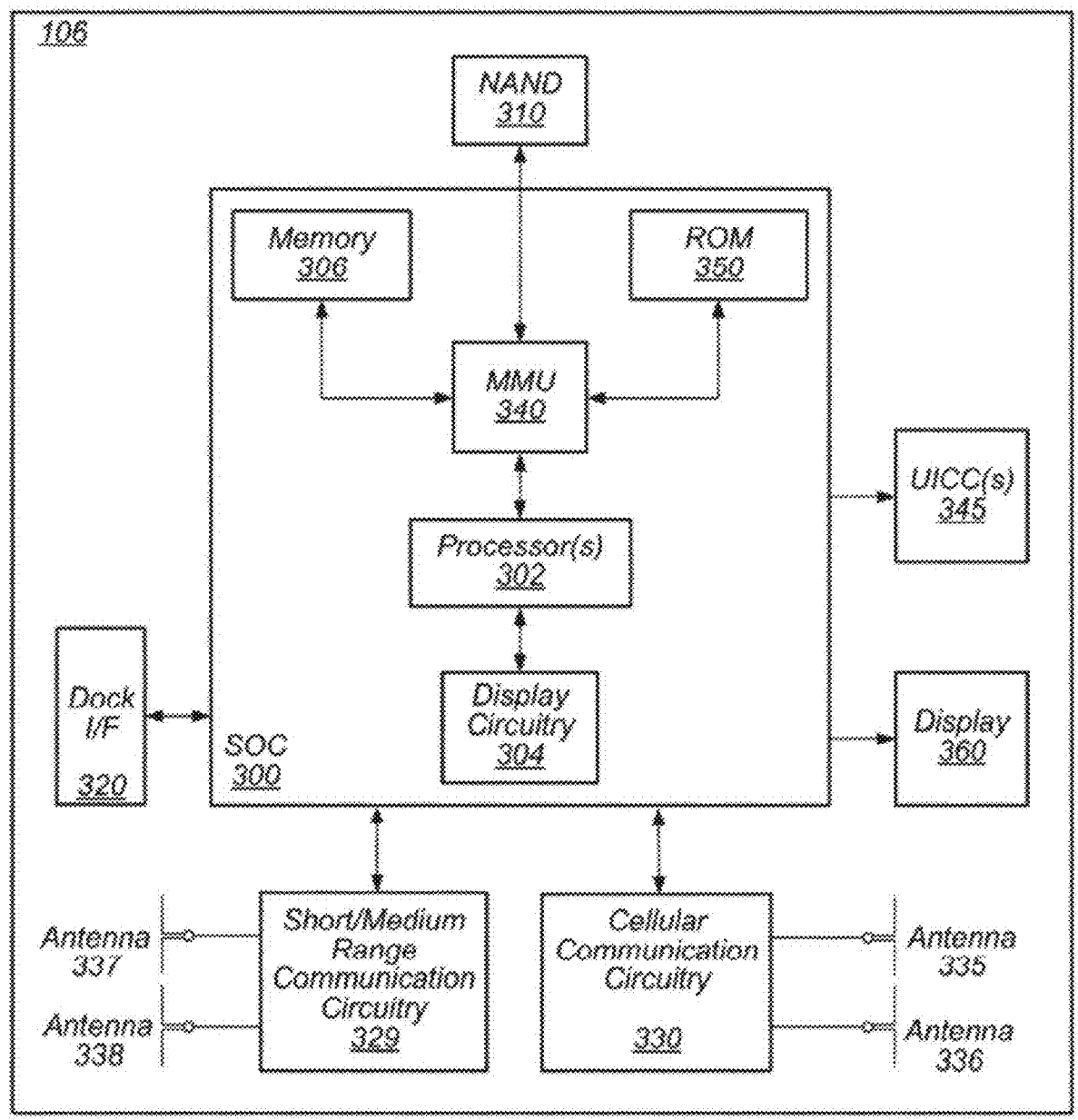
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.)

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to receive configuration information to enable communication device 106 to be configured to use default beams. The configuration information may sent by and received from a gNB (e.g., a base station). In some embodiments, these default beams are for a default beam for the physical downlink shared channel (PDSCH), a default aperiodic Channel Status Information-Reference Signal (CSI-RS) beam, and/or a default PUCCH/SRS beam and pathloss reference signal (RS).

As described herein, the communication device 106 may include hardware and software components for implementing the above features for receiving configuration information to configure a device to use default beams as described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short-range wireless communication circuitry 329 may include one or more ICs that are configured to perform the functions of short-range wireless communication circuitry 32. In addition, each integrated circuit may include circuitry (e.g., first circuitry, second circuitry, etc.) configured to perform the functions of short-range wireless communication circuitry 329.

Figure 4:
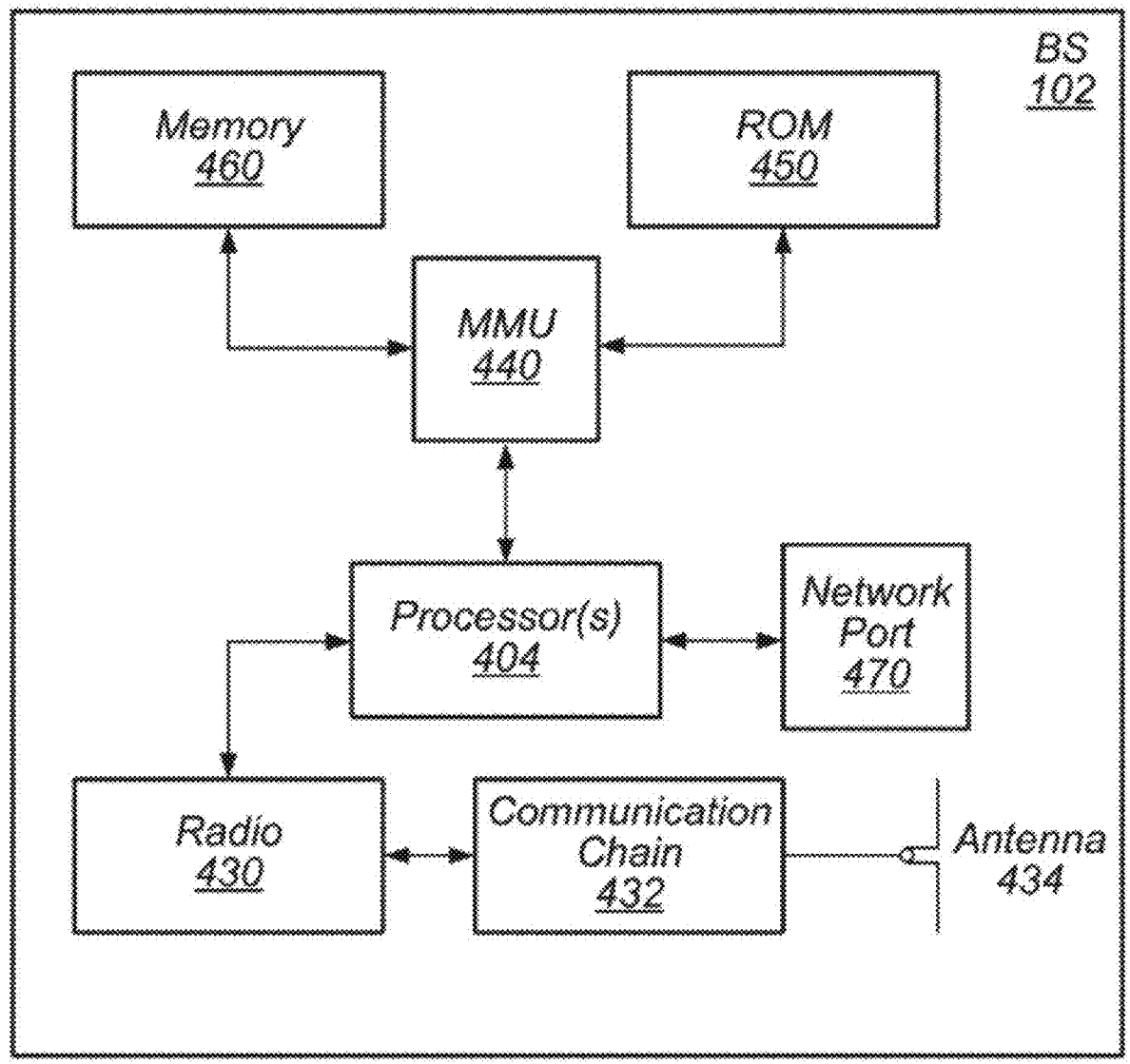
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
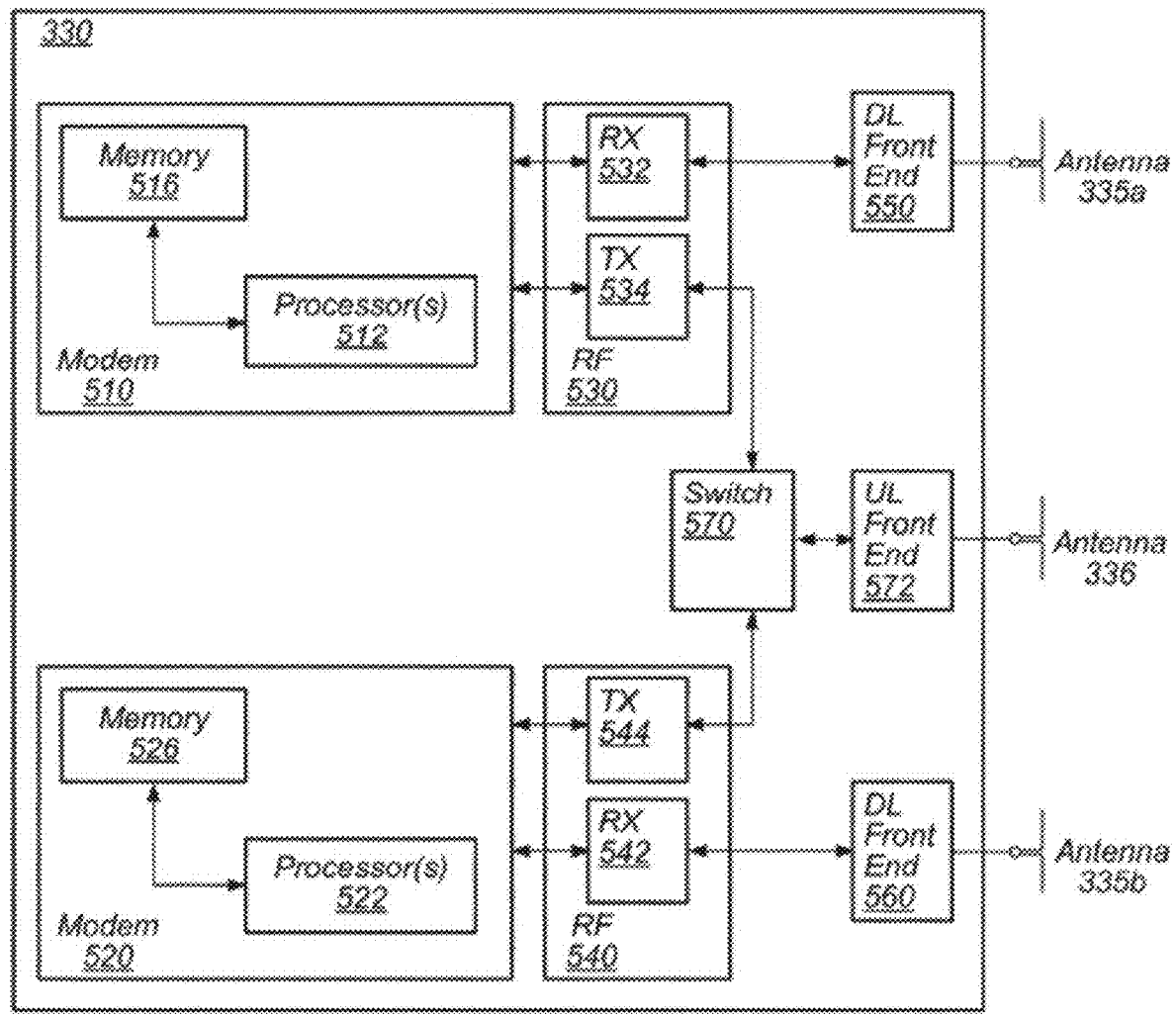
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for receiving configuration information to configure a device to communicate using default beams (e.g., receive information, transmit information), as well as the various other techniques described herein. The configuration information may sent by and received from a gNB (e.g., a base station) or other device or system. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for receiving configuration information to configure a device to communicate using default beams (e.g., receive information, transmit information), as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

In some embodiments, the techniques described herein are for configuring a UE to use a default beam in 5G. In some embodiments, the default beam is the default beam for the PDSCH. In another embodiment, the default beam is the default beam for the PUCCH and SRS. In another embodiment, the default beam is the default beam for the CSI-RS.

As defined in NR release 15 and 16, the default beam for PDSCH and aperiodic CSI-RS when scheduling offset is below a threshold UE reported has been defined as follows in sections 5.1.5 and 5.2.1.5.1 of 3GPP TS 38.214: for single-TRP operation, the default beam for PDSCH and aperiodic CSI-RS is based on the beam of CORESET with lowest ID in latest slot when multiple CORESETs are configured in the same BWP, for single-DCI based multi-TRP operation, the default beam for PDSCH is based on the beam corresponding to the 2 active TCI States corresponding to the lowest TCI codepoint in the same BWP and the default beam for aperiodic CSI-RS is based on the first TCI State applied for PDSCH default beam in the same BWP, and for multi-DCI based multi-TRP operation, the default beam for PDSCH and aperiodic CSI-RS is based on the TCI State applied for the CORESET with lowest ID in latest slot when multiple CORESETs are configured with the same CORESETPoolIndex configured as the CORESET with scheduling PDCCH in the same BWP. If there is any known signal in the slot, the beam for the known signal can be applied for PDSCH and CSI-RS.

Also, in NR release 15 and 16, the default beam for PUCCH/SRS when spatial relation and pathloss reference signal is not configured is defined as follows in sections 7.2.1, 7.3.1, and 9.2.2 of 3GPP TS 38.213 and in section 6.2.1 of 3GPP TS 38.214: the default beam and pathloss is based on the downlink signal configured as QCL-typeD in the TCI State for CORESET with lowest ID in the same BWP, where for SRS, if there is no CORESET configured in the BWP, the active TCI with lowest ID should be applied. Also, in these sections, NR release 15 and 16 states that for FR1, where QCL-TypeD is not applicable, the default pathloss reference signal could be the downlink signal configured as QCL-typeA for the CORESET with lowest ID.

In NR release 17, to support Single Frequency Network (SFN) operation, one CORESET can be configured with two TCI States with at least one of the following options. In a first option, one of the TCI states can be associated with {average delay, delay spread} and another TCI states can be associated with {average delay, delay spread, Doppler shift, Doppler spread} (i.e., QCL-TypeA). In a second option, one the TCI state can be associated with {average delay, delay spread} and another TCI state with {Doppler shift, Doppler spread} (i.e., QCL-TypeB). In a third option, one of the TCI state can be associated with {delay spread} and another TCI states can be associated with {average delay, delay spread, Doppler shift, Doppler spread} (i.e., QCL-TypeA). In a fourth option, both TCI states can be associated with {average delay, delay spread, Doppler shift, Doppler spread} (i.e., QCL-TypeA). For these four options, each TCI state may be additionally associated with {Spatial Rx parameter} (i.e., QCL-TypeD).

However, if two TCI States are configured for a CORESET, there is an issue as to how to determine the default beam for the following cases: 1) PDSCH with scheduling offset below a threshold; aperiodic CSI-RS with scheduling offset below a threshold; Physical Uplink Control Channel (PUCCH) beam and pathloss reference signal when spatial relation and pathloss reference signal are not configured; and a sounding reference signal (SRS) beam and pathloss reference signal when spatial relation and pathloss reference signal are not configured.

To overcome this issue, in some embodiments, the UE may be configured by the gNB (e.g., base station) with a default beam configuration for the PDSCH. In some embodiments, the configuration process includes identifying which CORESET is used for default PDSCH beam selection when two TCI states are configured for at least one CORESET and then using one or more of the TCI states of the CORESET to determine the default PDSCH beam. Note that in some embodiments, the default PDSCH beam is only applied when one of the TCI states in the TCI state list configured by RRC signaling is configured with QCL-typeD. In other words, the default PDSCH beam is only applied when at least one of the TCI states of a CORESET is configured with quasi-co-location with spatial receiving parameters (or information indicative of such parameters).

There are a number of options for configuring the UE to select the CORESET (from among the CORESETs that are sent) to determine the default PDSCH beam when an offset between reception of downlink control information (DCI) in the scheduling physical downlink control channel (PDCCH) and corresponding PDSCH is less than a threshold the UE reported. In other words, based on the configuration, the UE is configured to monitor a CORESET sent from the gNB to determine the default PDSCH beam.

In some embodiments for CORESET selection, as option 1, the default PDSCH beam is based on the monitored CORESET with lowest ID in latest slot in the same BWP and two TCI states are configured for this CORESET. That is, the CORESET with lowest ID in latest slot in the same BWP and configured with two TCI states is selected. If no CORESET is configured for the current active BWP in RRC, then the two TCI states corresponding to the lowest TCI codepoint is selected.

In another embodiment for CORESET selection, as option 2, the default PDSCH beam is based on the monitored CORESET with lowest ID in latest slot in the same BWP and configured with only one TCI State. That is, the CORESET with lowest ID in latest slot in the same BWP and configured with only one TCI state is selected. If no CORESET is configured for the current active BWP in RRC, the TCI State corresponding to the lowest TCI codepoint can be selected, with the TCI codepoint corresponding to one TCI State being precluded.

In yet another embodiment for CORESET selection, as option 3, the default PDSCH beam is based on the monitored CORESET with lowest ID in latest slot in the same BWP regardless of whether the monitored CORESET is configured with one TCI state or two TCI states. In such a case, in some embodiments, the UE may expect the number of TCI states configured in all CORESETs in a BWP to be the same.

In still yet another embodiment for CORESET selection, as option 4, whether the default PDSCH beam is based on the monitored CORESET with lowest ID in latest slot in the same BWP and configured with two TCI states or whether the default PDSCH beam is based on the monitored CORESET with lowest ID in latest slot in the same BWP and configured with only 1 TCI State is configured by higher layer signaling (e.g., RRC signaling, MAC CE signaling, etc.) and reported by the UE to the gNB as part of its UE capability information.

In some embodiments, an RRC parameter is used to enable the new default PDSCH beam behavior.

Figure 6:
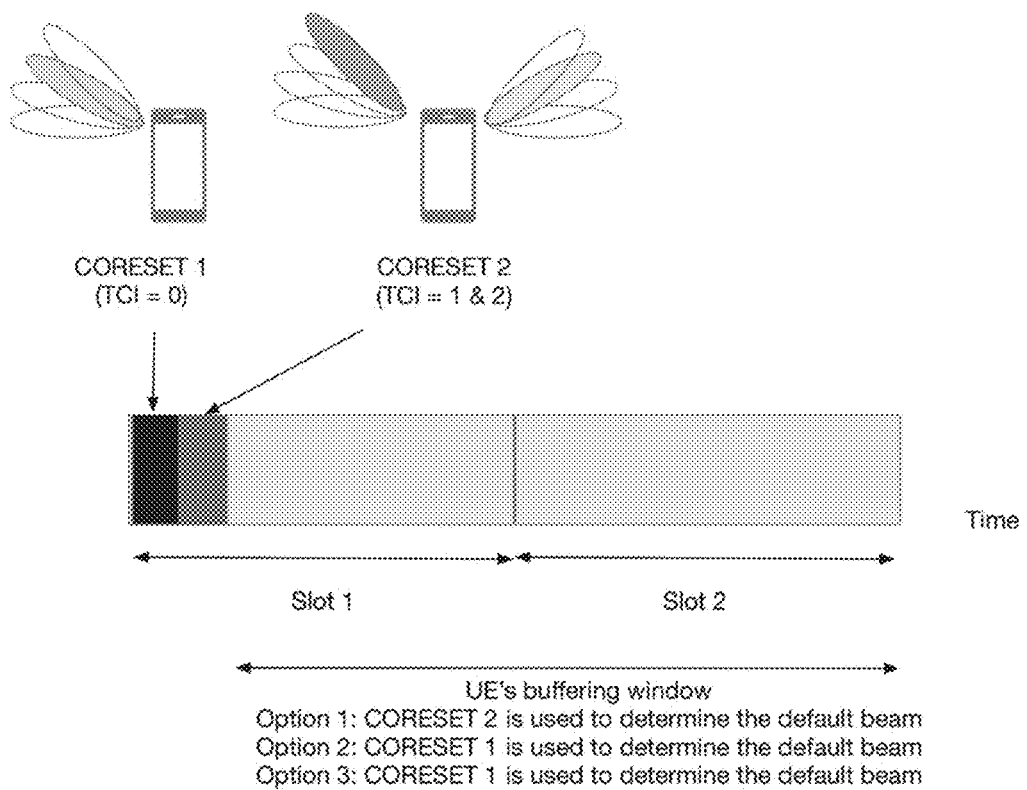
FIG. 6 illustrates an example of selecting a CORESET to determine default PDSCH beam.

FIG. 6 illustrates an example of selecting a CORESET to determine default PDSCH beam. Referring to FIG. 6, if option 1 is used for selecting the CORESET described above, then the candidate CORESETs should be CORESET 2 only to determine the default PDSCH beam as it's the only CORESET with two TCIs. If option 2 is used for selecting the CORESET described above, then candidate CORESETs to determine the default PDSCH beam should be CORESET 1 only as CORESET 1 only has one TCI. If option 3 is used for selecting the CORESET described above, then candidate CORESETs should be CORESET 1 and 2 as they are both part of slot 1. However, in this case, CORESET 1 is selected for use in determining the default PDSCH beam since it is with lowest ID.

After the CORESET to determine the default beam has been selected, the default PDSCH beam is determined using information in the selected (monitored) CORESET. Options 1 and 3 described above for using a selected CORESET with 2 TCI states are to determine the default beam, one or the following embodiments may be used to determine the default PDSCH beam from the selected CORESET. In a first embodiment (option 1), the PDSCH beam is determined based on both TCI states in the CORESET. This implies that the PDSCH is also based on SFN scheme.

In a second embodiment (option 2), the default PDSCH beam is determined based on one of the two TCI states of the selected CORESET. In such a case, in a first sub-option of this embodiment, the selected TCI from the two TCE states to use to determine the default PDSCH beam is predefined. For example, in some embodiments, the first TCI stat is used, or in another embodiment, the TCI state with the lowest ID is used.

In another, second sub-option of the embodiment in which the default PDSCH beam is determined based on one of the two TCI states of the selected CORESET, the selected TCI is configured by higher layer signaling (e.g., RRC signaling, MAC CE signaling, etc.) to indicate to the UE which one of the two TCI states is to be used to determine the default PDSCH beam.

In yet another, third sub-option of the embodiment in which the default PDSCH beam is determined based on one of the two TCI states of the selected CORESET, the selected TCI is determined by the indicated QCL types if options 1-3 described above for CORESET selection are used. In such a case, in some embodiments, the TCI to provide QCL-TypeA information is selected to determine the default PDSCH beam, in another example, the TCI to provide information other than QCL-TypeA is selected to determine the default PDSCH beam, an in yet another embodiment, the TCI to provide QCL-TypeB information is selected.

In another, fourth sub-option of the embodiment in which the default PDSCH beam is determined based on one of the two TCI states of the selected CORESET, the selected TCI from the two TCI states to use to determine the default beam is determined by one or more of a slot, a subframe, and/or a frame index. In such a case, in one example embodiment, the first TCI is applied for the odd slot and the second TCI is applied for the even slot.

In a third embodiment (option 3), the default PDSCH beam is determined based on either one or two of the TCI states of the two TCI states of the selected CORESET and whether the UE is configured to use one or both of the TCI states to determine the default PDSCH beam is configured by the gNB using higher layer signaling (e.g., RRC signaling, MAC CE signaling, etc.), or reported by the UE to the gNB as part of its UE capability information. Note that configuring for option 1 (i.e., based on both TCI states) implies the configuration supports a SFN scheme, while configuring for option 2 (i.e., based on one of both TCI states) implies the configuration supports a non-SFN scheme.

Also, in some embodiments, when there is a known CORESET with 2 TCI states configured in overlapped symbols, any of the three embodiments (options 1-3) for determining the default PDSCH beam from a CORESET having two TCI states described above can be used to determine the default PDSCH beam.

Figure 7:
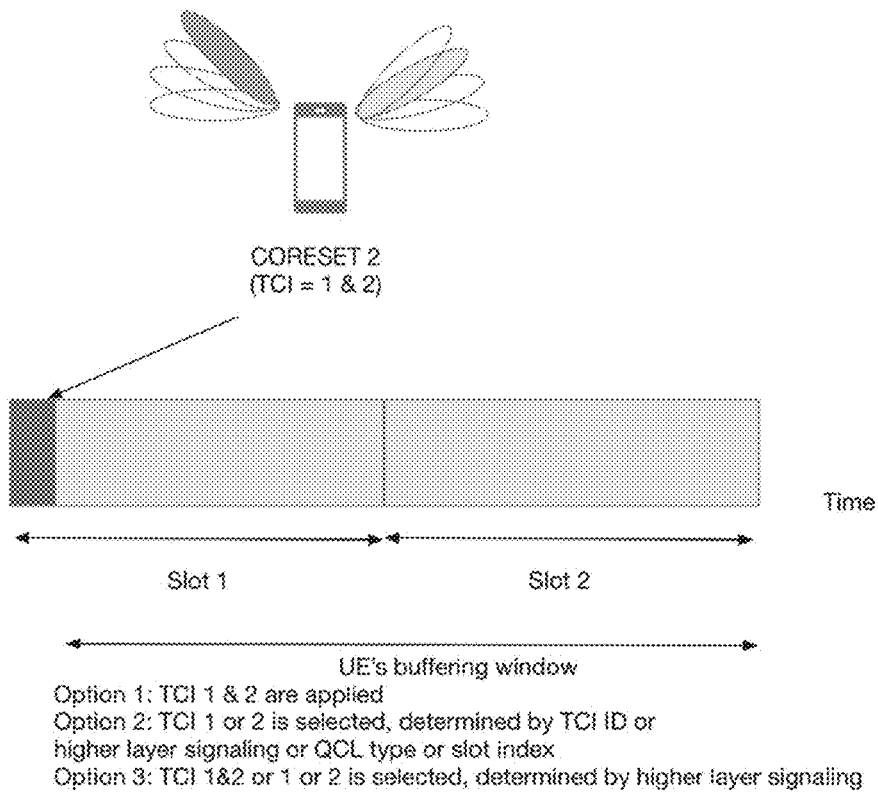
FIG. 7 illustrates an example for TCI selection from a selected CORESET to determine default PDSCH beam.

FIG. 7 illustrates an example for TCI selection from a selected CORESET to determine default PDSCH beam. Referring to FIG. 7, in option 1 where the default PDSCH beam is determined based on both TCI states, both TCI states 1 and 2 of CORESET 2 are applied and PDSCH is assumed to be based on the SFN manner. In option 2 where the default PDSCH beam is determined based on one of the two TCI states, either TCI states 1 or 2 of CORESET 2 is selected to determine the default PDSCH beam and it may be based on first through fourth sub-options described above. In this example, whether TCI states 1 or 2 is selected is determined by TCI ID, higher layer signaling, QCL type, or slot index. In option 3, whether to select both TCI states 1 and 2, or only TCI state 1 or only TCI state 2 states is configured by the gNB and determined by higher layer signaling (e.g., RRC signaling, MAC CE signaling, etc.).

In some embodiments, the UE is also configured with configuration information from the gNB as to the selection of a default aperiodic Channel State Information—Reference Signal (CSI-RS) beam. In some embodiments, the default PDSCH beam and the aperiodic CSI-RS beam are aligned with each other. In other words, the UE is configured with configuration information from the gNB to determine the default PDSCH beam and the aperiodic CSI-RS beam using the same information. This is because the UE has no information as to whether a PDSCH or CSI-RS exists.

In some embodiments, if two TCI States are configured for a CORESET, the default aperiodic CSI-RS beam is determined as follows. Since the default aperiodic CSI-RS beam is selected based on the default PDSCH beam, if one TCI is selected to determine the default PDSCH beam based on the options described above for selecting the CORESET and using one TCI state in the selected/monitored CORESET, then that same TCI state is applied for determining the default aperiodic CSI-RS beam. Similarly, if two TCI states are selected to determine the default PDSCH beam based on the options described above for selecting the CORESET and using the two TCI states in the selected/monitored CORESET, then the options depicted in FIG. 7 are also used to determine the default aperiodic CSI-RS beam. When there is a known CORESET configured with 2 TCI states in overlapped symbols, the solutions in FIG. 7 are used to determine the default aperiodic CSI-RS beam. Note that in some embodiments the default aperiodic CSI-RS beam is applied for CSI-RS without TRS-Info (information) configured, and is applied when one of the TCI states in TCI State list configured by RRC signaling from the gNB is configured with QCL-typeD.

In some embodiments, the UE is also configured with configuration information from the gNB as to the information to use to determine a default PUCCH/SRS beam and pathloss reference signal. In some embodiments, if two TCI states are configured for a CORESET, the following options use CORESET selection to determine the default PUCCH/SRS beam and pathloss reference signal. First, in some embodiments, referred to as option 1, the default PUCCH/SRS beam is based on the CORESET with lowest ID in the same BWP and the two TCI states that are configured for this CORESET. In another embodiment, referred to as option 2, the default PUCCH/SRS beam is based on the CORESET with lowest ID in the same BWP and only the 1 TCI state that is configured for this CORESET. In yet another embodiment, referred to as option 3, the default PUCCH/SRS beam is based on the CORESET with lowest ID in the same BWP regardless of whether 1 or 2 TCI states are configured for this CORESET. In such a case, in some embodiments, the UE expects the number of TCI states configured in all CORESETs in a BWP to be the same. In still yet another embodiment, referred to as option 4, whether to apply options 1 or 2 described above (e.g., using the CORESET with lowest ID in the same BWP and the two TCI states that are configured for this CORESET or using the CORESET with lowest ID in the same BWP and the only one TCI state that is configured for the CORESET) to determine the default PUCCH/SRS beam is based on higher layer signaling (e.g., RRC signaling, MAC CE signaling, etc.), or based on UE capability information reported by the UE to the gNB.

For the default SRS beam, in some embodiments, if there is no CORESET in the BWP, the UE is configured by configuration information from the gNB to select the default beam and pathloss RS selection. In some embodiments, referred to as option 1, the TCI indicated by lowest TCI codepoint corresponding to the 1 TCI state activated by MAC CE is applied and used to determine the default SRS beam. In another embodiment, referred to as option 2, the TCI indicated by lowest TCI codepoint corresponding to the 2 TCI states activated by MAC CE is applied and used to determine the default SRS beam. In yet another embodiment, referred to as option 3, the TCI state indicated by lowest TCI codepoint activated by MAC CE is applied and used to determine the default SRS beam. In still yet another embodiment, referred to as option 4, whether to apply option 1 (using the TCI indicated by lowest TCI codepoint corresponding to the 1 TCI state activated by MAC CE) or option 2 (using the TCI indicated by lowest TCI codepoint corresponding to the 2 TCI states activated by MAC CE) is configured by higher layer signaling (e.g., RRC or MAC CE signaling), or configured based on UE capability information reported by the UE to the gNB.

Figures 8A, 8B:
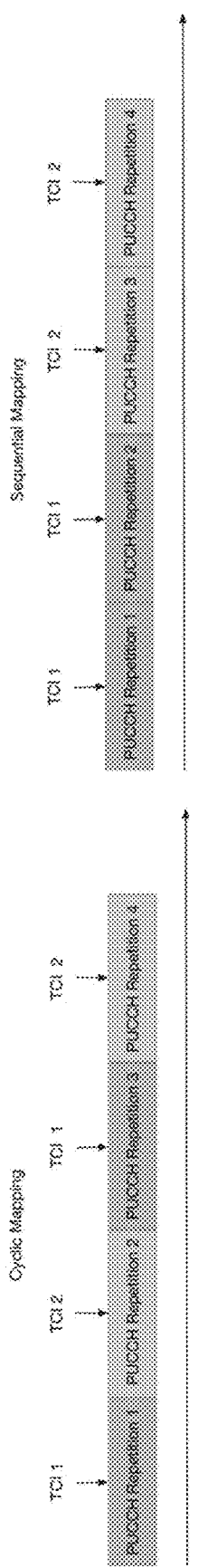
FIGS. 8A and 8B illustrate examples of cyclic mapping and sequential mapping.

With respect to the default PUCCH/SRS beam and pathloss reference signal, in some embodiments, when a CORESET or TCI codepoint with 2 TCI states is selected, the default PUCCH/SRS beam and pathloss RS can be determined as follows. In some embodiments, the default beam and pathloss RS is determined, for PUCCH without repetition configured and SRS, using one TCI from the 2 TCI states applied for the CORESET. In various embodiments, the TCI selection may be made in the same way as using one of the first through fourth sub-options described above for determining the default PDSCH beam based on one of the two TCI states of a selected CORESET. In another embodiment, the default beam and pathloss RS is determined, for PUCCH with repetition configured, by applying one TCI state, similarly to the determination used for PUCCH without repetition configured. In yet another embodiment, the default beam and pathloss RS is determined, for PUCCH with repetition configured, by using both TCI states in a selected CORESET. In such a case, in some embodiments, the mapping between TCI and repetition is configured by higher layer signaling (e.g., RRC signaling, MAC CE signaling, etc.), DCI, or is predefined based on cyclic mapping and sequential mapping. FIGS. 8A and 8B illustrate examples of cyclic mapping and sequential mapping. In another embodiment, whether to apply one TCI or use both TCI states of a selected CORESET to determine the default PUCCH/SRS beam and pathloss RS is configured by higher layer signaling (e.g., RRC signaling, MAC CE signaling, etc.), DCI, or based on UE capability information reported by the UE to the gNB.

Figure 9:
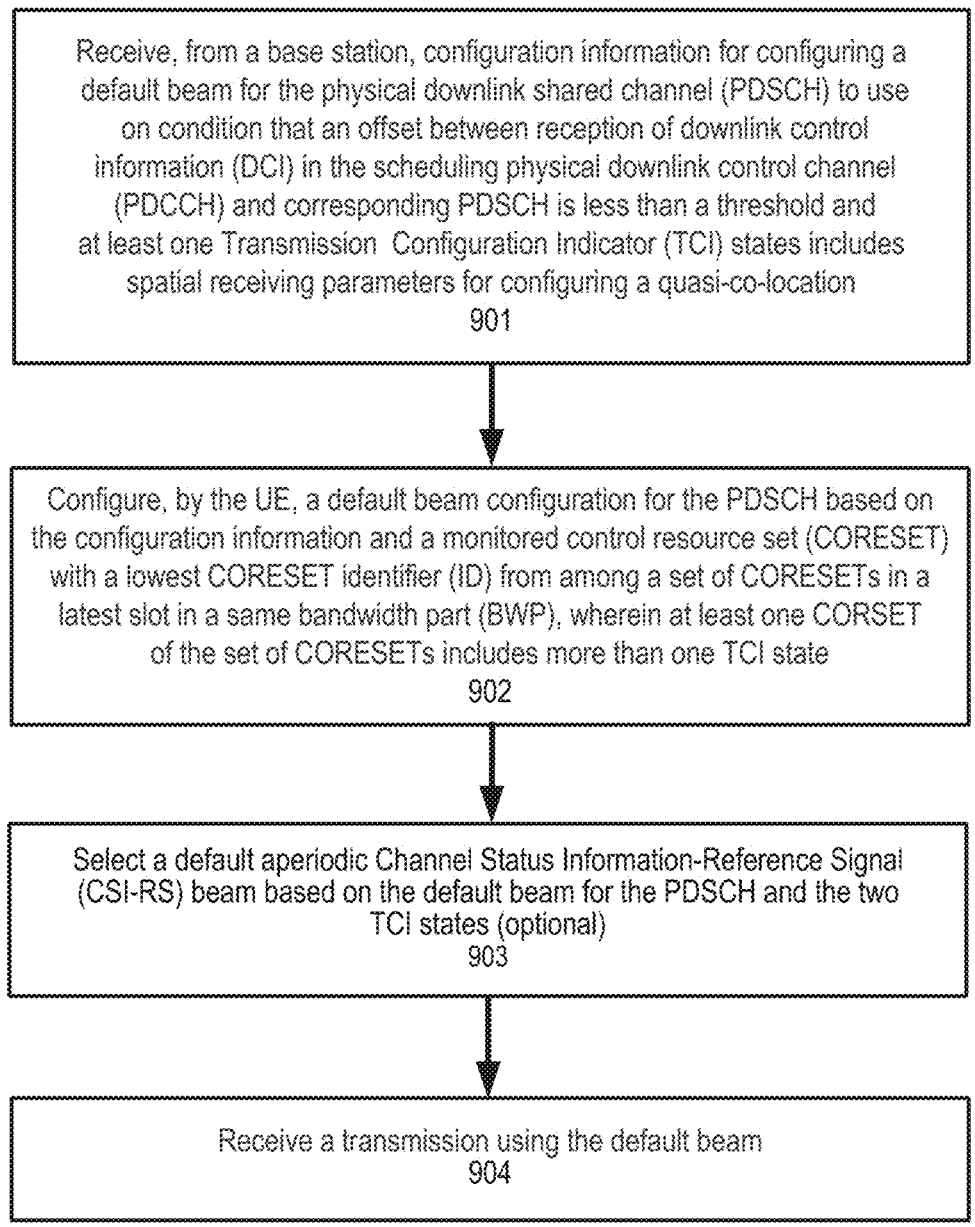
FIG. 9 is a flow diagram of one embodiment of a process for configuring a UE.

FIG. 9 is a flow diagram of one embodiment of a process for configuring a UE. The process is performed by processing logic that comprises hardware (circuitry, dedicated logic, etc.), software (e.g., software running on a chip, software run on a general-purpose computer system or a dedicated machine, etc.), firmware, or a combination of the three. In some embodiments, the operations in the process are performed by a UE in a 5G NR communication system. In some embodiments, the operations in the process are performed by baseband processor in a 5G NR communication system.

Referring to FIG. 9, the process begins by processing logic receiving, from a base station, configuration information for configuring a default beam for the physical downlink shared channel (PDSCH) to use on condition that an offset between reception of downlink control information (DCI) in the scheduling physical downlink control channel (PDCCH) and corresponding PDSCH is less than a threshold and at least one Transmission Configuration Indicator (TCI) states includes spatial receiving parameters for configuring a quasi-co-location (processing block 901).

Next, processing logic configures a default beam configuration for the PDSCH based on the configuration information and a monitored control resource set (CORESET) with a lowest CORESET identifier (ID) from among a set of CORESETs in a latest slot in a same bandwidth part (BWP), where at least one CORSET of the set of CORESETs includes more than one TCI state (processing block 902).

In some embodiments, processing logic also selects a default aperiodic Channel Status Information-Reference Signal (CSI-RS) beam based on the default beam for the PDSCH and the two TCI states (processing block 903). This is optional. In some embodiments, the selection is based on a configuration specified in the configuration information.

After configuring the default beam configuration for the PDSCH, processing logic sends or enables receiving a transmission using the default PDSCH beam (processing block 904).

In some embodiments, the default beam configuration is based on two TCI states configured for the monitored CORESET. In some embodiments, if no CORESET is configured, the default beam configuration is based on two TCI states corresponding to a lowest TCI codepoint.

In some embodiments, the default beam configuration is based on only one TCI state configured for the monitored CORESET. In some embodiments, in the case where the default beam configuration is based on two TCI states corresponding to a lowest TCI codepoint, the default beam configuration is based on a TCI state corresponding to a lowest TCI codepoint if no CORESET is configured. In another embodiment, in the case where the default beam configuration is based on two TCI states corresponding to a lowest TCI codepoint, the one TCI is predefined. In some embodiments, the one TCI state is predefined as the TCI state that is first among the TCI states or a TCI state with a lowest ID among the TCI states. In yet another embodiment, in the case where the default beam configuration is based on two TCI states corresponding to a lowest TCI codepoint, the one TCI is configured by Radio Resource Control (RRC) or MAC (Medium Access Control) CE (MAC Control Element) signaling. In still yet another embodiment, in the case where the default beam configuration is based on two TCI states corresponding to a lowest TCI codepoint, the one TCI is determined by QCL type. In still yet another embodiment, in the case where the default beam configuration is based on two TCI states corresponding to a lowest TCI codepoint, the one TCI is determined by one or more of a slot, a subframe, and a frame index.

In some embodiments, receiving the indication of at least one of a default beam from the base station comprises receiving, by the UE, RRC or MAC CE signaling.

In some embodiments, the default beam configuration is based on two TCI states being configured for the monitored CORESET or only one TCI state configured for the monitored CORESET, wherein whether the default beam configuration is based on one or two TCI states is specified by RRC or MAC CE signaling.

Figure 10:
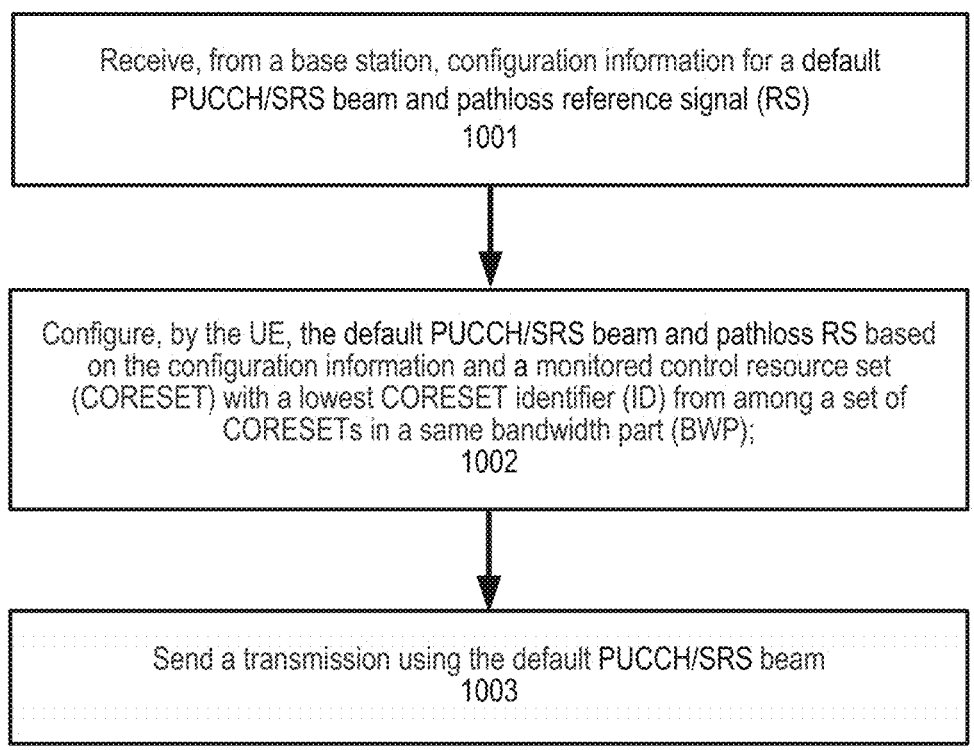
FIG. 10 is a flow diagram of another embodiment of a process for configuring a UE.

FIG. 10 is a flow diagram of another embodiment of a process for configuring a UE. The process is performed by processing logic that comprises hardware (circuitry, dedicated logic, etc.), software (e.g., software running on a chip, software run on a general-purpose computer system or a dedicated machine, etc.), firmware, or a combination of the three. In some embodiments, the operations in the process are performed by a UE in a 5G NR communication system. In some embodiments, the operations in the process are performed by baseband processor in a 5G NR communication system.

Referring to FIG. 10, the process begins by processing logic receiving from a base station, configuration information for a default PUCCH/SRS beam and pathloss reference signal (RS) (processing block 1001).

In response to receiving the configuration information, processing logic configures the default PUCCH/SRS beam and pathloss RS based on the configuration information and a monitored control resource set (CORESET) with a lowest CORESET identifier (ID) from among a set of CORESETs in a same bandwidth part (BWP) (processing block 1002).

Once configured, processing logic sends or enable sending a transmission using the default PUCCH/SRS beam (processing block 1003).

In some embodiments, at least one TCI state is configured for the monitored CORESET and the configuration specified in the configuration information for a default PUCCH/SRS beam and pathloss RS is based on at least one TCI state. In another embodiment, two TCI states are configured for the monitored CORESET and the configuration specified in the configuration information for a default PUCCH/SRS beam and pathloss RS is based on two TCI states.

In some embodiments, wherein whether the monitored CORESET that has one or two TCI states being used to configure the default PUCCH/SRS beam and pathloss RS is configured by received RRC or MAC CE signaling.

In some embodiments, if no CORESET is configured, the default PUCCH/SRS beam and pathloss RS is based on a TCI indicated by a lowest TCI codepoint corresponding to one TCI activated by MAC CE. In another embodiment, if no CORESET is configured, the default PUCCH/SRS beam and pathloss RS is based on a TCI indicated by a lowest TCI codepoint corresponding to two TCIs activated by MAC CE.

In yet another embodiment, if no CORESET is configured, the default PUCCH/SRS beam and pathloss RS is based on a TCI indicated by a lowest TCI codepoint activated by MAC CE. In still yet another embodiment, if no CORESET is configured, the default PUCCH/SRS beam and pathloss RS is based on a TCI indicated by a lowest TCI codepoint corresponding to one TCI activated by MAC CE or based on a TCI indicated by a lowest TCI codepoint corresponding to two TCIs activated by MAC CE, wherein using the lowest TCI codepoint corresponding to one or two TCIs activated by MAC CE is configured by received RRC or MAC CE signaling.

In some embodiments, wherein, when a CORESET or TCI codepoint with two TCI states is selected, the default PUCCH/SRS beam and pathloss RS for PUCCH without repetition configured is based one TCI from the two TCI states. In another embodiment, wherein, when a CORESET or TCI codepoint with two TCI states is selected, the default PUCCH/SRS beam and pathloss RS for PUCCH with repetition configured is based the two TCI states for a PUCCH.

In some embodiments, wherein, when a CORESET or TCI codepoint with two TCI states is selected, the default PUCCH/SRS beam and pathloss RS for PUCCH with repetition configured is based the one or two TCI states for a PUCCH, and using one or two TCIs is configured by received RRC or MAC CE signaling.

Figure 11:
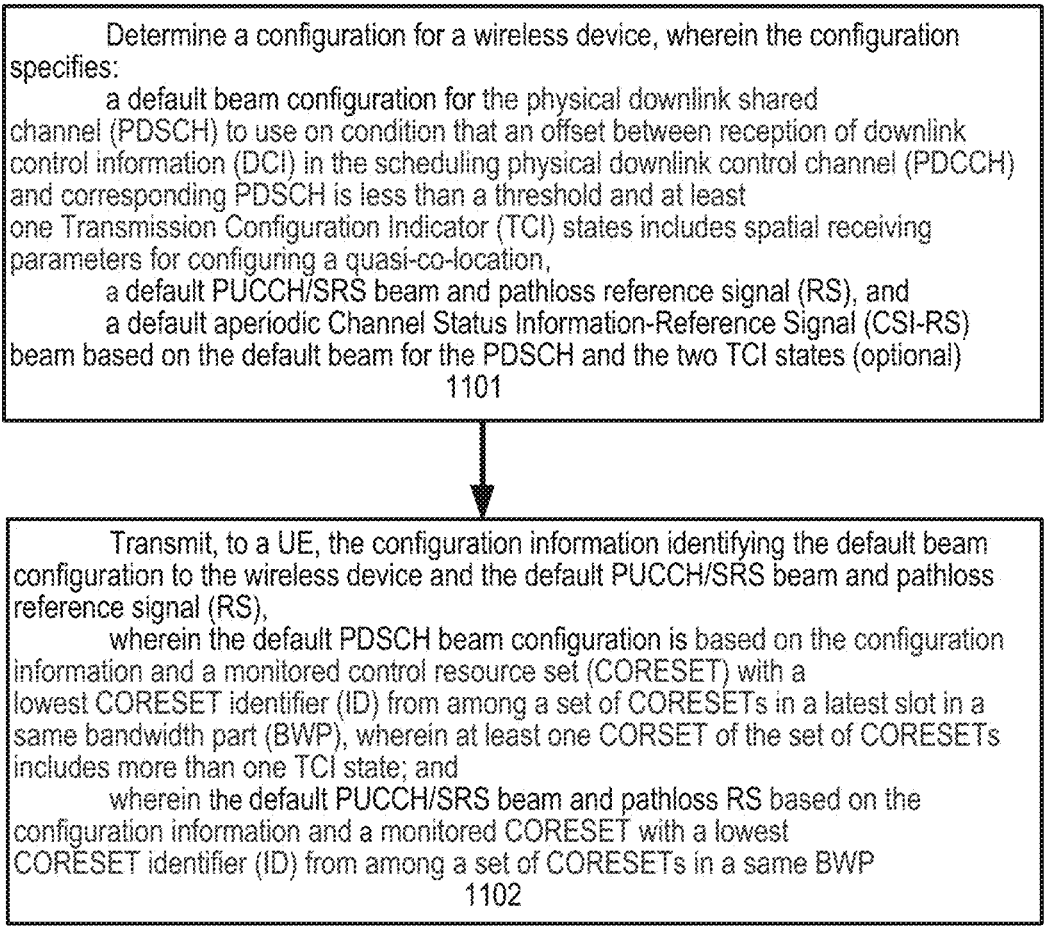
FIG. 11 is a flow diagram of one embodiment of a process by which network equipment configures a UE.

FIG. 11 is a flow diagram of one embodiment of a process by which network equipment configures a UE. The process is performed by processing logic that comprises hardware (circuitry, dedicated logic, etc.), software (e.g., software running on a chip, software run on a general-purpose computer system or a dedicated machine, etc.), firmware, or a combination of the three. In some embodiments, the operations in the process are performed by network equipment operating in a 5G new radio a spectrum in 5G new radio (NR) above 52.6 GHz. In some embodiments, the operations in the process are performed by baseband processor in a 5G NR communication system.

Referring to FIG. 11, the process begins by processing logic determines a configuration for a wireless device, wherein the configuration is set forth in configuration information that specifies: a default beam configuration for the physical downlink shared channel (PDSCH) to use on condition that an offset between reception of downlink control information (DCI) in the scheduling physical downlink control channel (PDCCH) and corresponding PDSCH is less than a threshold and at least one Transmission Configuration Indicator (TCI) states includes spatial receiving parameters for configuring a quasi-co-location, optionally a default PUCCH/SRS beam and pathloss reference signal (RS), and optionally a default aperiodic Channel Status Information-Reference Signal (CSI-RS) beam based on the default beam for the PDSCH and the two TCI states (processing block 1101).

In some embodiments, two TCI states are configured for the monitored CORESET. In some embodiments, at least one TCI state is configured for the monitored CORESET. In some embodiments, whether the monitored CORESET that has one or two TCI states being used to configure the default PUCCH/SRS beam and pathloss RS is configured by received RRC or MAC CE signaling.

In some embodiments, the default beam configuration is based on two TCI states configured for the monitored CORESET. In some embodiments, in such a case, if no CORESET is configured, the default beam configuration is based on two TCI states corresponding to a lowest TCI codepoint. In another embodiment, the default beam configuration is based on only one TCI state configured for the monitored CORESET.

In some embodiments, in the case that the default beam configuration is based on only one TCI state configured for the monitored CORESET, the default beam configuration is based on a TCI state corresponding to a lowest TCI codepoint if no CORESET is configured. In another embodiment, in the case that the default beam configuration is based on only one TCI state configured for the monitored CORESET, the one TCI is predefined. In some embodiments, in such a case, the one TCI is predefined as a TCI that is first among the TCI states or a TCI state with a lowest ID among the TCI states. In yet another embodiment, in the case that the default beam configuration is based on only one TCI state configured for the monitored CORESET, the one TCI is configured by Radio Resource Control (RRC) or MAC (Medium Access Control) CE (MAC Control Element) signaling. In still yet another embodiment, in the case that the default beam configuration is based on only one TCI state configured for the monitored CORESET, the one TCI is determined by QCL type. In even another embodiment, in the case that the default beam configuration is based on only one TCI state configured for the monitored CORESET, the one TCI is determined by one or more of a slot, a subframe, and a frame index.

In some embodiments, when a CORESET or TCI codepoint with two TCI states is selected, the default PUCCH/SRS beam and pathloss RS for PUCCH without repetition configured is based one TCI from the two TCI states. In another embodiment, when a CORESET or TCI codepoint with two TCI states is selected, the default PUCCH/SRS beam and pathloss RS for PUCCH with repetition configured is based the two TCI states for a PUCCH. In yet another embodiment, when a CORESET or TCI codepoint with two TCI states is selected, the default PUCCH/SRS beam and pathloss RS for PUCCH with repetition configured is based the one or two TCI states for a PUCCH, wherein using one or two TCIs is configured by received RRC or MAC CE signaling.

In another embodiment, if no CORESET is configured, the default PUCCH/SRS beam and pathloss RS is based on a TCI indicated by a lowest TCI codepoint corresponding to two TCIs activated by MAC CE. In yet another embodiment, if no CORESET is configured, the default PUCCH/SRS beam and pathloss RS is based on a TCI indicated by a lowest TCI codepoint activated by MAC CE. In still yet another embodiment, if no CORESET is configured, the default PUCCH/SRS beam and pathloss RS is based on a TCI indicated by a lowest TCI codepoint corresponding to one TCI activated by MAC CE or based on a TCI indicated by a lowest TCI codepoint corresponding to two TCIs activated by MAC CE, wherein using the lowest TCI codepoint corresponding to one or two TCIs activated by MAC CE is configured by received RRC or MAC CE signaling.

In some embodiments, if no CORESET is configured, the default PUCCH/SRS beam and pathloss RS is based on a TCI indicated by a lowest TCI codepoint corresponding to one TCI activated by MAC CE.

After determining the configuration, processing logic transmits, to a UE, the configuration information identifying the default beam configuration to the wireless device and the default PUCCH/SRS beam and pathloss reference signal (RS), wherein the default PDSCH beam configuration is based on the configuration information and a monitored control resource set (CORESET) with a lowest CORESET identifier (ID) from among a set of CORESETs in a latest slot in a same bandwidth part (BWP), wherein at least one CORSET of the set of CORESETs includes more than one TCI state; and wherein the default PUCCH/SRS beam and pathloss RS, if specified in the configuration information, is based on the configuration information and a monitored CORESET with a lowest CORESET identifier (ID) from among a set of CORESETs in a same BWP (processing block 1102).

In some embodiments, sending the configuration information is performed using RRC or MAC CE signaling.

In some embodiments, the default aperiodic CSI-RS beam is selected based on the default beam for the PDSCH.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method of wireless communication at a User Equipment (UE) comprising:
   receiving, from a base station, configuration information for configuring a default beam for a physical downlink shared channel (PDSCH) to use on condition that an offset between reception of downlink control information (DCI) in a scheduling physical downlink control channel (PDCCH) and corresponding PDSCH is less than a threshold and at least one Transmission Configuration Indicator (TCI) states includes spatial receiving parameters for configuring a quasi-co-location;
   configuring, by the UE, a default beam configuration for the PDSCH based on the configuration information and a monitored control resource set (CORESET) with a lowest CORESET identifier (ID) from among a set of CORESETs in a latest slot in a same bandwidth part (BWP), wherein the monitored CORESET of the set of CORESETs includes more than one TCI state, and wherein the default beam configuration configured is based on the TCI state with a lowest TCI state ID for the monitored CORESET;
   in response to no CORESET being configured in the same BWP, the default beam configuration is configured based on two TCI states corresponding to a lowest TCI codepoint; and
   receiving a transmission using the default beam.

2. The method of claim 1 further comprising selecting a default aperiodic Channel Status Information-Reference Signal (CSI-RS) beam based on the default beam for the PDSCH and the two TCI states.

3. The method of claim 1 wherein receiving, from the base station, the configuration information for configuring the default beam comprises receiving, by the UE, radio resource control (RRC) signaling or media access control (MAC) control element (CE) signaling.

4. The method of claim 3 wherein the default beam configuration is configured based on two TCI states being configured for the monitored CORESET or only one TCI state configured for the monitored CORESET, wherein whether the default beam configuration is based on one or two TCI states is specified by the RRC signaling or the MAC CE signaling.

5. The method of claim 4 further comprising selecting a default aperiodic CSI-RS beam based on the default beam for the PDSCH.

6. A UE comprising one or more processors configured to perform operations comprising:
   receiving, from a base station, configuration information for configuring a default beam for a physical downlink shared channel (PDSCH) to use on condition that an offset between reception of downlink control information (DCI) in a scheduling physical downlink control channel (PDCCH) and corresponding PDSCH is less than a threshold and at least one Transmission Configuration Indicator (TCI) states includes spatial receiving parameters for configuring a quasi-co-location;
   configuring, by the UE, a default beam configuration for the PDSCH based on the configuration information and a monitored control resource set (CORESET) with a lowest CORESET identifier (ID) from among a set of CORESETs in a latest slot in a same bandwidth part (BWP), wherein the monitored CORESET of the set of CORESETs includes more than one TCI state, and wherein the default beam configuration configured is based on the TCI state with a lowest TCI state ID for the monitored CORESET;
   in response to no CORESET being configured in the same BWP, the default beam configuration is configured based on two TCI states corresponding to a lowest TCI codepoint; and
   receiving a transmission using the default beam.

7. The UE of claim 6 wherein the default beam configuration is configured based on two TCI states being configured for the monitored CORESET or only one TCI state configured for the monitored CORESET, and wherein the RRC signaling or the MAC CE signaling specifies whether the default beam configuration is configured based on one TCI state or two TCI states.

8. A baseband processor of a User Equipment (UE) that is coupled to computer-readable memory storing instructions that, when executed by the baseband processor, causes the baseband processor to perform operations comprising:
receiving, from a base station, configuration information for configuring a default beam for a physical downlink shared channel (PDSCH) to use on condition that an offset between reception of downlink control information (DCI) in a scheduling physical downlink control channel (PDCCH) and corresponding PDSCH is less than a threshold and at least one Transmission Configuration Indicator (TCI) states includes spatial receiving parameters for configuring a quasi-co-location;
configuring, by the UE, a default beam configuration for the PDSCH based on the configuration information and a monitored control resource set (CORESET) with a lowest CORESET identifier (ID) from among a set of CORESETs in a latest slot in a same bandwidth part (BWP), wherein the monitored CORESET of the set of CORESETs includes more than one TCI state, and wherein the default beam configuration configured is based on the TCI state with a lowest TCI state ID for the monitored CORESET;
in response to no CORESET being configured in the same BWP, the default beam configuration is configured based on two TCI states corresponding to a lowest TCI codepoint; and
receiving a transmission using the default beam.

9. The baseband processor of claim 8 wherein the one TCI state is predefined.

10. The baseband processor of claim 9 wherein the one TCI state is predefined as a TCI state that is first among the TCI states or a TCI state with a lowest ID among the TCI states.

11. The baseband processor of claim 8 wherein the one TCI state is configured by Radio Resource Control (RRC) or MAC (Medium Access Control) CE (MAC Control Element) signaling.

12. The baseband processor of claim 8 wherein the one TCI state is determined by QCL type.

13. The baseband processor of claim 8 wherein the one TCI state is determined by one or more of a slot, a subframe, and a frame index.

14. The baseband processor of claim 8 further comprising selecting a default aperiodic CSI-RS beam based on the default beam for the PDSCH and the one TCI state.

15. The baseband processor of claim 8 wherein receiving, from the base station, the configuration information for configuring the default beam comprises receiving, by the UE, radio resource control (RRC) signaling or media access control (MAC) control element (CE) signaling.

16. The baseband processor of claim 15 wherein the default beam configuration is configured based on two TCI states being configured for the monitored CORESET or only one TCI state configured for the monitored CORESET, wherein whether the default beam configuration is based on one or two TCI states is specified by the RRC or MAC CE signaling.

17. The baseband processor of claim 16 further comprising selecting a default aperiodic CSI-RS beam based on the default beam for the PDSCH.

18. A base station device of a communication system, comprising one or more processors configured to perform operations comprising:
transmitting, to a user equipment (UE), configuration information for configuring a default beam for a physical downlink shared channel (PDSCH) to use by the UE on condition that an offset between reception of downlink control information (DCI) in a scheduling physical downlink control channel (PDCCH) and corresponding PDSCH is less than a threshold and at least one Transmission Configuration Indicator (TCI) states includes spatial receiving parameters for configuring a quasi-co-location;
transmitting, to the UE, a control resource set (CORESET) with lowest CORESET identifier (ID) from among a set of CORESETs in a latest slot in a same bandwidth part (BWP), wherein a monitored CORESET of the set of CORESETs includes more than one TCI state, and wherein the default beam configuration configured is based on the TCI state with a lowest TCI state ID for the monitored CORESET;
in response to no CORESET being configured in the same BWP, the default beam configuration is configured based on two TCI states corresponding to a lowest TCI codepoint; and
transmitting, to the UE, a transmission using the default beam.

* * * * *